Sept. 14, 1937.　　　　J. BIEBER　　　　2,093,185
TRAILER BRAKE
Filed Jan. 28, 1937　　　　3 Sheets-Sheet 1
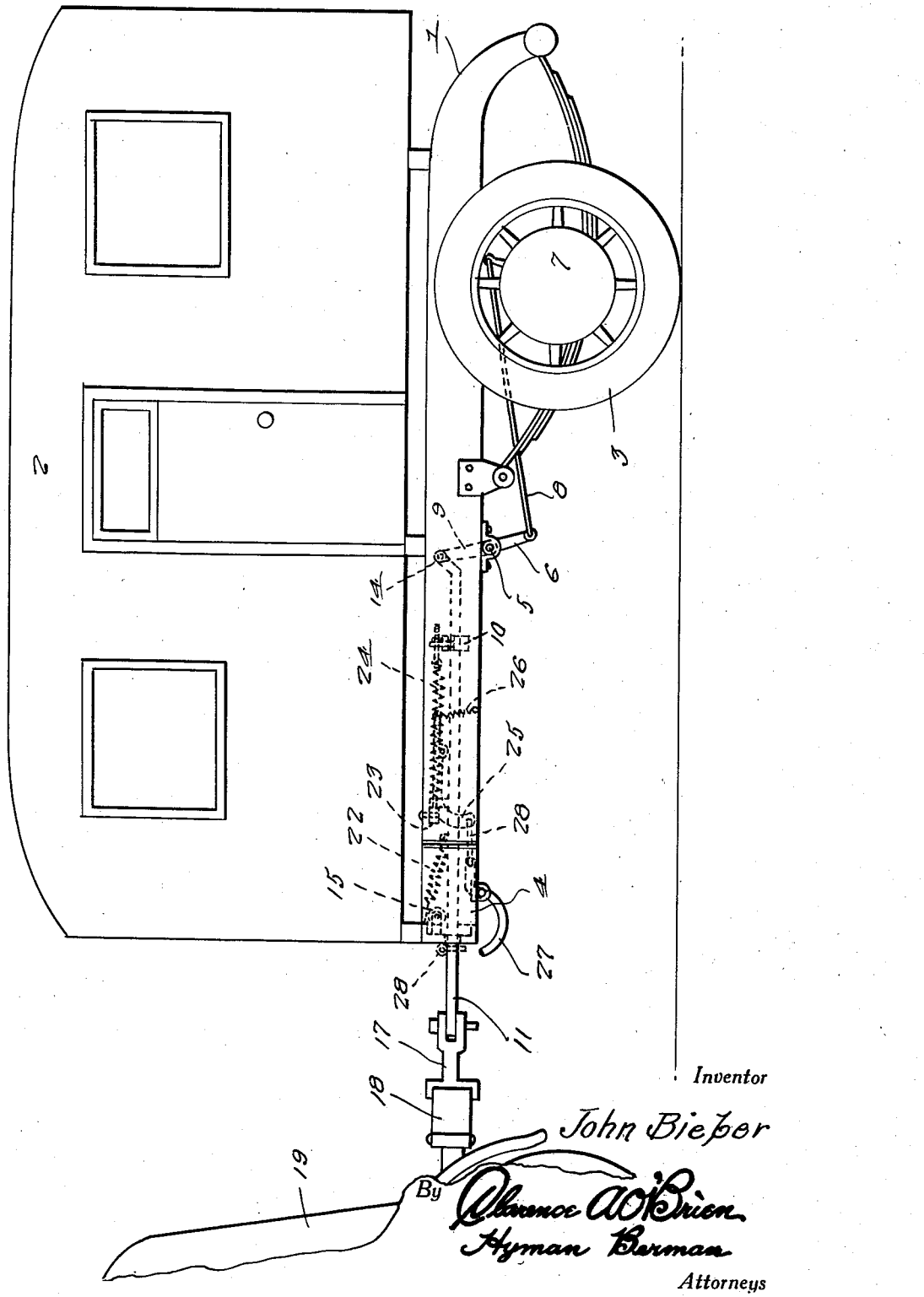
Inventor
John Bieber
By Clarence A. O'Brien
Hyman Berman
Attorneys

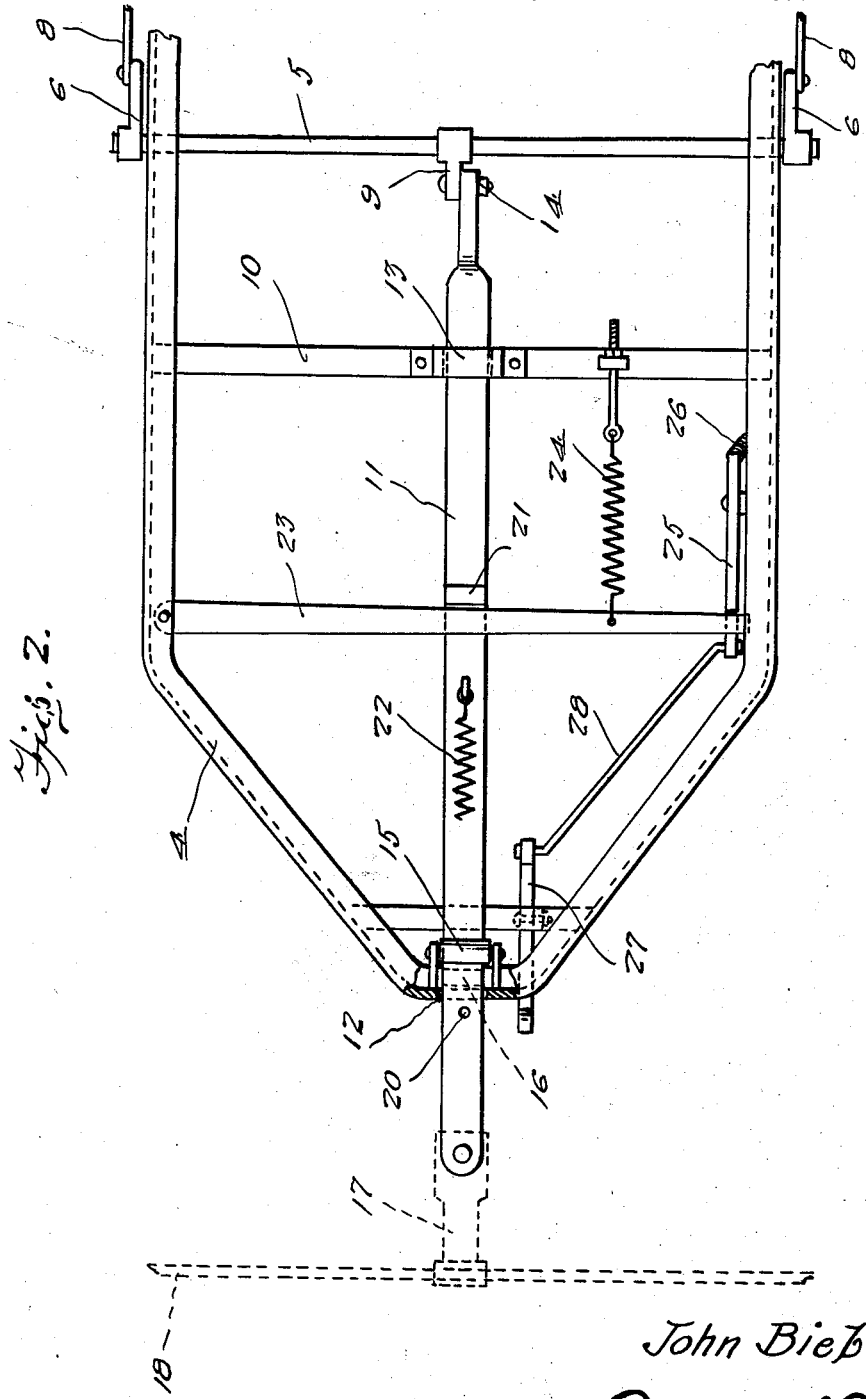

Sept. 14, 1937.  J. BIEBER  2,093,185
TRAILER BRAKE
Filed Jan. 28, 1937  3 Sheets-Sheet 3
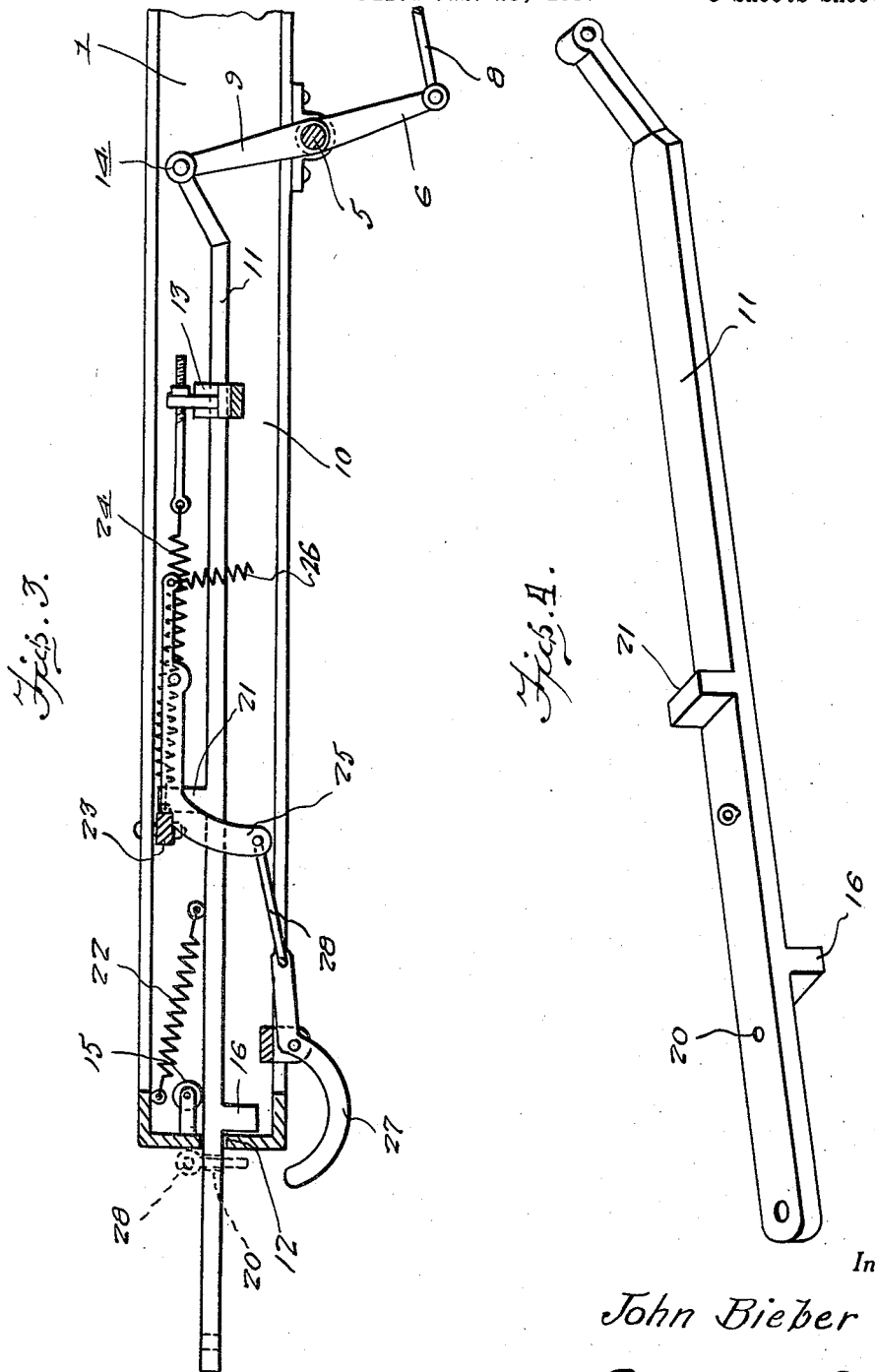
Inventor
John Bieber
By Clarence A. O'Brien
Hyman Berman
Attorneys Patented Sept. 14, 1937

2,093,185

UNITED STATES PATENT OFFICE 2,093,185

TRAILER BRAKE

John Bieber, Redelm, S. Dak., assignor of forty-eight per cent to O. S. Nygaard, Dupree, S. Dak.

Application January 28, 1937, Serial No. 122,859

4 Claims. (Cl. 188—112)

The present invention relates to new and useful improvements in brakes particularly for two wheeled trailers and has for its primary object to provide, in a manner as hereinafter set forth, a mechanism embodying a novel construction and arrangement whereby the brakes of the trailer will be automatically applied when said trailer pushes forwardly against the towing vehicle, as when stopping or going down grade.

Another very important object of the invention is to provide a trailer brake of the aforementioned character which will be automatically applied in the event that the trailer should become accidentally disconnected from the towing vehicle.

Still another very important object of the invention is to provide a trailer brake of the aforementioned character which may be conveniently applied manually when desired, as when the trailer is parked.

Other objects of the invention are to provide a trailer brake of the character described which will be comparatively simple in construction, strong, durable, highly efficient and reliable in operation, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a trailer equipped with an automatic brake mechanism constructed in accordance with the present invention.

Figure 2 is a top plan view of the invention.

Figure 3 is a vertical longitudinal sectional view.

Figure 4 is a detail view in perspective of the drawbar.

Referring now to the drawings in detail, it will be seen that the reference numeral 1 designates a frame on which a suitable body 2 is mounted, said frame being provided with a single pair of supporting wheels 3. The frame 1 includes a substantially V-shaped forward end portion 4. Journaled on the frame 1, at an intermediate point, is a rocker shaft 5 having fixed on its end portions arms 6 which are connected to the brakes 7 of the wheels 3 by rods 8. Fixed at an intermediate point on the rocker shaft 5 is an arm 9 which, it will be noted, extends in an opposite direction from said rocker shaft as compared with the arms 6. Mounted transversely in the frame 1, forwardly of the rocker shaft 5 is a brace 10.

Mounted for longitudinal sliding movement in the frame 1 is a drawbar 11 the forward portion of which extends slidably through an opening 12 which is provided therefor in the forward end of said frame 1. The rear end portion of the drawbar 11 is slidably mounted in a guide 13 on the brace 10. At its rear end, the drawbar 11 is pivotally connected to the free end portion of the arm 9, as at 14.

A roller 15 is journaled in the forward end portion 4 of the frame 1 and rests on the drawbar 11 to permit said drawbar to slide freely while supporting a considerable portion of the weight of the trailer. Depending from the drawbar 11 is a lug 16 for abutting engagement with the forward end of the frame 1 for pulling the trailer. A suitable hitch 17 is provided at the forward end of the drawbar 11 for connecting said drawbar to the rear bumper 18, for example, of a towing vehicle 19. An opening 20 is provided in the forward portion of the drawbar 11 for receiving a pin for engagement with the forward end of the frame 1 when it is desired to back the trailer. A coil spring 22 is connected to the drawbar 11 for yieldingly urging said drawbar forwardly in a manner to release the brakes. Depending from the drawbar 11 at an intermediate point is a lug 21, the purpose of which will be presently set forth.

The reference numeral 23 designates a transverse lever which is pivotally connected, at one end, to one side of the frame 1 and which extends across the drawbar 11 for engagement with the lug 21. The reference numeral 24 designates a comparatively strong, adjustable spring which is connected to the free end portion of the lever 23 in a manner to yieldingly urge said lever rearwardly. Pivotally mounted, at an intermediate point, on the other side of the frame 1 is a latch 25 which is engageable with the free end portion of the lever 23 in a manner to positively secure said lever against actuation by the spring 24. A coil spring 26 is connected to one end of the latch 25 for yieldingly maintaining said latch in engagement with the lever 23. Pivotally mounted, at an intermediate point, for swinging movement in a vertical plane on the forward portion of the frame 1 is a substantially S-shaped longitudinal trip lever 27 which is operatively connected to the latch 25 by a rod 28. The trip lever 27 extends below the forward end of the frame 1 for engagement with the ground.

It is thought that the operation of the invention will be readily apparent from a consideration of the foregoing. When the trailer pushes forwardly against the towing vehicle 19, as when stopping or when going down grade, the drawbar 11 slides rearwardly in the frame 1 against the tension of the comparatively weak coil spring 22 for rocking the shaft 5 in a direction to apply the brakes 7 of said trailer. Of course, when forward pull is again exerted on the drawbar 11 by the towing vehicle, the drawbar moves forwardly in the frame 1 and the brakes are released. As hereinbefore stated, the lug 16 engages the forward end of the frame 1 for pulling the load forwardly, said lug 16 constituting a positive stop for limiting the forward sliding movement of said drawbar 11. The spring 22 also assists in releasing the brakes. Should the trailer become accidently disconnected from the towing vehicle and the forward end thereof drop to the ground, the trip lever 27 engages the ground first and is actuated thereby in a manner to disengage the latch 25 from the lever 23 against the tension of the coil spring 26. When the lever 23 is thus released, the comparatively strong coil spring 24 pulls said lever rearwardly thereby moving the drawbar 11 in a corresponding direction for automatically applying the trailer brakes. The brakes will then remain applied until manually released. Also, when the trailer is parked the trip lever 27 may be manually actuated to permit application of the brakes. When the trailer is to be backed, a pin is inserted in the opening 20 in the drawbar 11 for engagement with the forward end of the frame 1. In Figures 1 and 3 of the drawings, this removable pin is shown in dotted lines and designated by the reference numeral 28.

It is believed that the many advantages of an automatic trailer brake constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:—

1. In a brake operating mechanism for trailers of the type including a frame and a pair of supporting wheels, said wheels comprising brakes, a drawbar slidably mounted in the frame and adapted for attachment to a towing vehicle, means operatively connecting said drawbar to the brakes, a lever pivotally mounted on the frame and operatively engaged with the drawbar for applying the brakes, resilient means for actuating said lever, a latch mounted on the frame and releasably engaged with the lever for securing said lever against actuation by said resilient means, a trip lever mounted on the frame and engageable with the ground for actuation thereby, and means operatively connecting said trip lever to the latch for releasing the first named lever.

2. In a trailer including a frame having supporting wheels and brakes on said wheels, a drawbar slidably mounted in said frame and adapted for connection with a towing vehicle, means for operatively connecting said drawbar to the brakes, tensioned means for operating the drawbar, and means to control said tensioned means including a trip lever engageable with the ground when the drawbar is disconnected from the vehicle.

3. In a trailer including supporting wheels having brakes, a slidably mounted drawbar adapted for attachment to a towing vehicle, means operatively connecting said drawbar to the brakes, a lug on the drawbar, a lever pivotally mounted on the trailer and engageable with the lug for actuating the drawbar in a direction to apply the brakes, a coil spring connected to the lever for actuating the same, a latch engaged with the lever for releasably securing same against actuation by the coil spring, a pivotally mounted trip lever mounted on the trailer and engageable with the ground for actuation thereby, and a rod operatively connecting the trip lever to the latch to release the latter.

4. A trailer comprising a frame including a substantially V-shaped forward end portion having an opening therein, a pair of supporting wheels for the frame, said supporting wheels including brakes, a rocker shaft journaled on the frame, arms fixed on the end portions of said rocker shaft, rods connecting the brakes to said arms, another arm fixed on the rocker shaft at an intermediate point, a brace mounted transversely in the frame forwardly of the rocker shaft, a guide mounted on said brace, a drawbar slidably mounted in said guide and the opening and adapted for connection with a towing vehicle, a roller mounted on the forward end of the frame and resting on the drawbar for supporting said forward end of the frame thereon, a lug on the drawbar engageable with the forward end of the frame for pulling the trailer, a spring connected with the drawbar for yieldingly urging said drawbar forwardly in the frame for releasing the brakes, another lug on the drawbar, a lever pivotally mounted, at one end, on one side of the frame and extending transversely over the drawbar and engageable with the second named lug for actuating said drawbar in a direction to apply the brakes, a comparatively strong coil spring connected to said lever for actuating the same, a latch pivotally mounted, at an intermediate point, on the other side of the frame and tensioned for engagement with the free end portion of the lever for releasably securing said lever against actuation by the second named coil spring, a trip lever pivotally mounted on the forward end portion of the frame and engageable with the ground for actuation thereby, and a rod operatively connecting said trip lever to the latch for disengaging said latch in opposition to the tension exerted thereagainst and from the first named lever.

JOHN BIEBER.